(12) United States Patent
Dorai et al.

(10) Patent No.: US 7,937,618 B2
(45) Date of Patent: May 3, 2011

(54) DISTRIBUTED, FAULT-TOLERANT AND HIGHLY AVAILABLE COMPUTING SYSTEM

(75) Inventors: Chitra Dorai, Chappaqua, NY (US); Robert E. Strom, Ridgefield, CT (US); Huining Feng, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 11/740,556

(22) Filed: Apr. 26, 2007

(65) Prior Publication Data

US 2008/0270838 A1  Oct. 30, 2008

(51) Int. Cl.
    *G06F 11/00*  (2006.01)
(52) U.S. Cl. ............................. 714/16; 714/38
(58) Field of Classification Search .............. 714/13, 714/15, 16, 38
    See application file for complete search history.

(56) References Cited

U.S. PATENT DOCUMENTS

| | | | |
|---|---|---|---|
| 4,665,520 A | 5/1987 | Strom et al. | |
| 5,794,005 A * | 8/1998 | Steinman | 703/17 |
| 5,801,938 A * | 9/1998 | Kalantery | 700/2 |
| 5,802,267 A * | 9/1998 | Shirakihara et al. | 714/15 |
| 5,828,878 A * | 10/1998 | Bennett | 718/102 |
| 6,026,499 A * | 2/2000 | Shirakihara et al. | 714/11 |
| 6,078,930 A | 6/2000 | Lee et al. | |
| 6,341,262 B1 * | 1/2002 | Damani et al. | 703/16 |
| 6,397,352 B1 * | 5/2002 | Chandrasekaran et al. | 714/16 |
| 6,553,515 B1 * | 4/2003 | Gross et al. | 714/47 |
| 6,563,829 B1 * | 5/2003 | Lyles et al. | 370/395.21 |
| 6,584,581 B1 * | 6/2003 | Bay et al. | 714/16 |
| 6,708,288 B1 * | 3/2004 | Ziegler et al. | 714/15 |
| 7,013,348 B1 * | 3/2006 | Carson et al. | 709/238 |
| 7,376,867 B1 * | 5/2008 | Aguilera et al. | 714/21 |
| 2003/0005102 A1 | 1/2003 | Russell | |
| 2003/0050954 A1 * | 3/2003 | Tayyar et al. | 709/102 |

(Continued)

OTHER PUBLICATIONS

Russell, D.L., "State restoration in systems of communicating processes", IEEE Transactions on Software Engineering, Mar. 1980.

(Continued)

*Primary Examiner* — Michael C Maskulinski
*Assistant Examiner* — Elmira Mehrmanesh
(74) *Attorney, Agent, or Firm* — Scully, Scott, Murphy & Presser, P.C.; Stephen C. Kaufman, Esq.

(57) ABSTRACT

A method and system for achieving highly available, fault-tolerant execution of components in a distributed computing system, without requiring the writer of these components to explicitly write code (such as entity beans or database transactions) to make component state persistent. It is achieved by converting the intrinsically non-deterministic behavior of the distributed system to a deterministic behavior, thus enabling state recovery to be achieved by advantageously efficient checkpoint-replay techniques. The method comprises: adapting the execution environment for enabling message communication amongst and between the components; automatically associating a deterministic timestamp in conjunction with a message to be communicated from a sender component to a receiver component during program execution, the timestamp representative of estimated time of arrival of the message at a receiver component. At a component, tracking state of that component during program execution, and periodically checkpointing the state in a local storage device. Upon failure of a component, the component state is restored by recovering a recent stored checkpoint and re-executing the events occurring since the last checkpoint. The system is deterministic by repeating the execution of the receiving component by processing the messages in the same order as their associated timestamp.

22 Claims, 8 Drawing Sheets

U.S. PATENT DOCUMENTS

| | | | |
|---|---|---|---|
| 2004/0024578 A1* | 2/2004 | Szymanski et al. | 703/17 |
| 2005/0268146 A1* | 12/2005 | Jin et al. | 714/2 |
| 2005/0278578 A1* | 12/2005 | Buskens et al. | 714/38 |
| 2006/0045020 A1* | 3/2006 | Picco et al. | 370/249 |
| 2006/0156065 A1* | 7/2006 | Glass | 714/18 |
| 2006/0168338 A1* | 7/2006 | Bruegl et al. | 709/240 |
| 2007/0050582 A1 | 3/2007 | Mangione-Smith | |
| 2007/0294537 A1* | 12/2007 | Peyravian et al. | 713/178 |
| 2008/0310460 A1* | 12/2008 | Bargauan | 370/522 |

OTHER PUBLICATIONS

Jefferson, D., "Virtual time", ACM Transactions of Programming Language and Systems, Jul. 1985.

Strom, et al., "Optimistic Recovery in Distributed Systems", ACM Transactions on Computer Systems, Aug. 1985.

Bhola, et al., "Exactly-once delivery in a content-based published-subscribe system", Proceedings of the International Conference on Dependable Systems and Networks (DSN'2002).

Bacon, et al., "Guava: a dialect of Java without data races", Proceedings of the 15th ACM SIGPLAN conference on Object-oriented programing, systems, languages, and applications, 2000.

Strom, R. E., "Fault-Tolerance in the SMILE Stateful Publish-Subscribe System" DEBS 2004—International Workshop on Distributed Event-Based Systems, May 2004, ACM, BCS, IEEE, pp. 1-6.

Cristian et al., "A timestamp-based checkpointing protocol for long-lived distributed computations", Proceedings of the Symposium on Reliable Distribted Systems, vol. SYMP. 10, Sep. 30, 1991, pp. 12-20.

Smith et al., "Completely asynchronous 1-15 optimistic recovery with minimal rollbacks" Fault-Tolerant Computing, 1995. FTCS-25. Digest of Papers, Twenty-Fifth International Symposium, Jun. 27, 1995, pp. 361-370.

Reiher et al., "Virtual time based dynamic load management in the Time Warp Operating System" Distributed Simulation. Proceedings of the SCS Multiconference SCS, 1990, pp. 103-111.

Mattern, "Virtual Time and Global States of Distributed Systems" Parallel and Distributed Algorithms, Proceedings of the International Workshop on Parallel and Distributed Algorithms, Oct. 3, 1988, pp. 215-226.

* cited by examiner

DISTRIBUTED, FAULT-TOLERANT AND HIGHLY AVAILABLE COMPUTING SYSTEM

FIELD OF THE INVENTION

The present invention relates generally to application development tools, methods and systems for developing and executing distributed systems, and more particularly, an improved environment for developing and executing distributed, transparently fault-tolerant, and highly available systems for executing component oriented applications.

BACKGROUND OF THE INVENTION

SCA Service Component Architecture provides an open, technology-neutral model for implementing IT services that define a business function. The SCA also provides a model for the assembly of business solutions from collections of individual services, with control over aspects of the solution such as access methods and security. With a SCA, customers are able to more easily create new, and transform existing, IT assets into reusable services that may be rapidly adapted to changing business requirements. The specifications that enable the building of SCA (middleware) components take advantage of a Service-Oriented Architecture (SOA), which structures IT assets as a series of reusable services that perform business functions. The Service Oriented Architecture combines the ability to invoke remote objects and functions (called "services") with tools for dynamic service discovery, placing an emphasis on interoperability. Currently, a goal of the industry is to provide application developers with simpler and more powerful ways of constructing applications based on SOA.

Moreover, in the development of distributed systems implementing SCA components, it is a goal to provide for transparent and fault-tolerant availability of 'non-volatile' data that may either represent persistent 'settings' (to be stored on mass-media throughout the distributed system) or 'state' preserved in a fault-tolerant manner. Presently, the development of distributed fault-tolerant and highly available systems is ad-hoc, error-prone, and time-consuming. Current solutions are analogous to an example currency exchange system where the fluctuation of currency price and exchange operations may be out of order or non-atomic. Execution is usually non-deterministic due to the network or threading: Existing mechanisms for persistence (entity beans, JDBC, etc) are heavyweight, and they necessitate extra knowledge and extra code.

For example, a current solution implements entity beans, e.g., "Enterprise Java Bean" (EJB) that include the server-side component architecture for the J2EE platform. EJBs purportedly support rapid and simplified development of distributed, transactional, secure and portable Java applications. EJBs support a container architecture that allows concurrent consumption of messages and provide support for distributed transactions, so that database updates, message processing, and connections to enterprise systems using the J2EE architecture can participate in the same transaction context.

It would be highly desirable to eliminate the need to require programmers to learn specialized methodologies and structures such as transactions, JDBC, or entity beans that separate out component state into separate objects and to persist that state, and, instead, to automatically provide persistence and fault-tolerance for ordinary code (also called transparent fault-tolerance).

There do exist techniques for transparent fault-tolerance in distributed systems, including a technique described in U.S. Pat. No. 4,665,520 commonly owned by the assignee of the present invention. The performance of such techniques is limited by the non-determinism of the behavior of communicating components in distributed systems, as each communication from one distributed component to another needs to be logged.

Moreover, it would be highly desirable to provide an execution server that transparently supports deterministic execution, fault tolerance and high availability, to avoid the performance problems of recovering non-deterministic distributed systems.

Furthermore, it would be highly desirable to provide a simple component-based model for programmers and, particularly, to provide a system and method for making middleware functions more accessible to the application developer.

SUMMARY OF THE INVENTION

Thus, it is a broad object of the invention to remedy the shortcomings of the prior art as described here above.

It is another object of the invention to provide an execution environment that transparently supports deterministic execution, fault tolerance and high availability for component-oriented applications.

The accomplishment of these and other related objects is achieved by a computing system and methodology. The deterministic computing system comprises:

a plurality of software components each implementing logic to perform a task, the components executing in an execution environment comprising on one or more machines connected in a network and adapted for communicating messages between the components;

means for automatically associating a deterministic timestamp in conjunction with a message to be communicated from a sender component to a receiver component during program execution, said timestamp representative of estimated time of arrival of said message at a receiver component;

means for deterministically executing said component by using said timestamps to generate a unique arrival order of input messages; and, means for tracking state of a component during program execution, and periodically checkpointing the state to a local storage device;

wherein upon failure of a machine, the component state is restored by recovering a recent stored checkpoint and re-executing the events occurring since the last checkpoint.

The computing system is deterministic by repeating the execution of a receiving component by processing the messages in the same order as their associated timestamps.

Further to this aspect of the invention, the component state may be checkpointed to a backup processor device.

According to a further embodiment of the invention, there is provided a method for deterministic execution of components in a computing system adapted for enabling message communication amongst and between said components, each component implementing logic to perform a task, the method comprising:

automatically associating a timestamp in conjunction with a message to be communicated from a sender component to a receiver component during program execution, the timestamp representative of estimated time of arrival of the message at a receiver component;

deterministically executing said component by using said timestamps to generate a unique arrival order of input messages; and, tracking state of that component during program execution, and periodically checkpointing the state to a local storage device;

wherein upon failure of a component, the component state is restored by recovering a recent stored checkpoint and re-executing the events occurring since the last checkpoint.

Yet according to a further embodiment of the invention, there is provided an environment for executing component-oriented applications, the environment adapted for communicating messages amongst and between components. The environment comprises:

a sub-system enabling high-level design of the components including specification of ports representing message inputs to and outputs from the components, each component implementing logic to perform a task;

a placement service for mapping a high-level design onto a lower level implementation in which components are assigned to particular processing engines of said execution environment;

a code enhancing means for:
automatically augmenting an input or output message of an associated component with a timestamp in conjunction with a message to be communicated from a sender component to a receiver component during program execution, the timestamp representative of estimated time of arrival of the message at a receiver component; and,
augmenting a component with code for tracking incremental changes to its state;

wherein, a state of a component is tracked during program execution, and the component state checkpointed in a local storage device; and, wherein upon failure of a component, the component state is restored by recovering a recent checkpoint and re-executing the events occurring since the last checkpoint.

In accordance with this aspect of the invention, the high-level design is neutral with respect to where components execute in said execution environment.

It would be further highly desirable to provide a distributed system according to each of the embodiments described that enables two types of components to co-exist: non-time-aware components, in which time estimation is automatic; and, time-aware components, where programmers may specify real-time constraints.

Further advantages of the present invention will become apparent to the ones skilled in the art upon examination of the drawings and detailed description. It is intended that any additional advantages be incorporated herein.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

As mentioned above, the proposed invention aims to address the problems in the art, namely the continued need to provide programmers with specialized methodologies and structures such as transactions, JDBC, or entity beans that separate out component state into separate objects in order to persist that state, and the need to log messages between components in non-deterministic implementations. This is addressed by providing a deterministic and highly available execution server that automatically provides persistence and fault-tolerance for executing component oriented applications.

Figure 1:
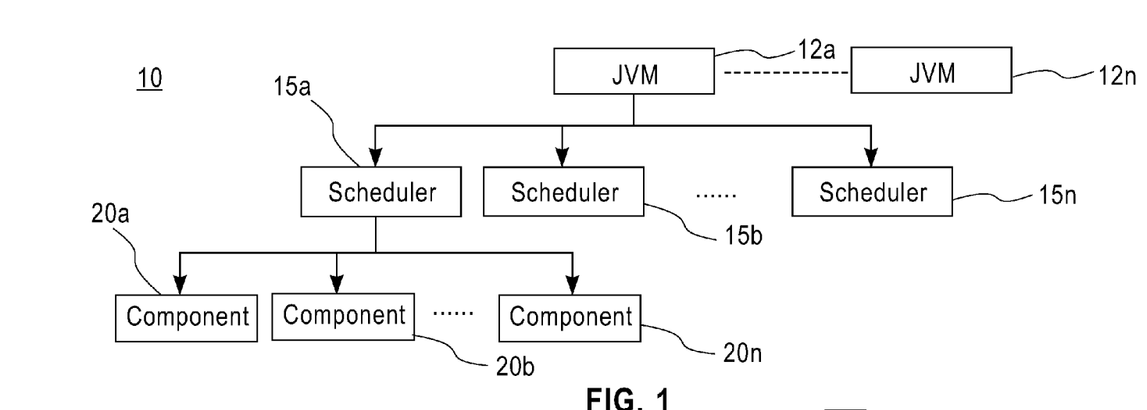
FIG. 1 depicts an execution server architecture 10 in which a middleware application is run for executing components and component oriented applications in accordance with the present invention.
Figure 2:
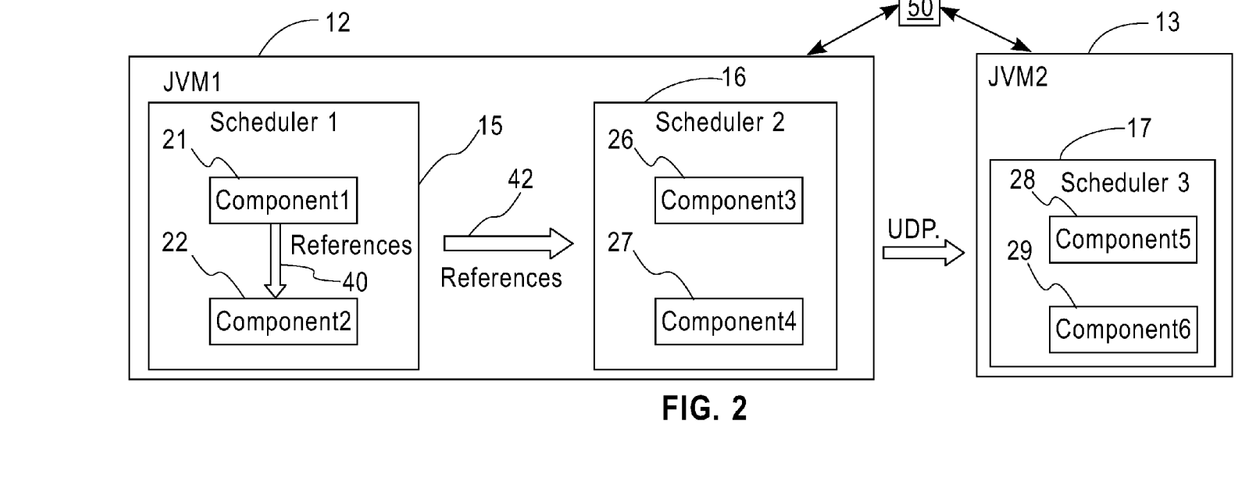
FIG. 2 depicts example messaging and communication between components in a single execution engine—in this example a Java Virtual Machine (JVM), and, between and among multiple execution engines according to the execution server architecture of the present invention.

FIG. 1 depicts an execution server architecture 10 in which the present middleware application is run for executing components and component oriented applications, represented generally as components 20a, ..., 20n. As shown in FIG. 1, each server includes one or more Java Virtual Machines, represented generally as JVM's 12a, ... 12n, such as shown in FIG. 1. It is understood that there may be multiple servers, and within each server, there may be multiple instances of Java Virtual Machine (JVMs), running, for example, as different processes within a single machine. It is understood that the use of Java and JVMs is purely exemplary; instead of a JVM one may use the execution environment of other languages in which application components are written. Within each JVM a scheduler layer is provided, containing at least one scheduler, represented generally as schedulers 15a, ... 15n, as a layer between JVMs and components in the hierarchy that are transparent to developers. A scheduler 15a, 15b ... 15n is a grouping of one or more tightly related components in a JVM, together with logic deciding when to execute these components. There may be multiple schedulers in the JVM, each managing the execution of its own respective component(s). For example, as shown in FIG. 2, JVM 12 implements a scheduler 15 for managing execution of components 21 and 22 and implements a scheduler 16 for executing components 26, 27. A second JVM 13 includes scheduler 17 for managing components 28 and 29. In particular, as shown in FIG. 2, the scheduler layer between JVMs and components in the hierarchy manages the execution of components in a JVM. It is understood that, within a JVM, the communication between components and that between schedulers are efficiently implemented by reference passing. There may be multiple schedulers in the JVM, each managing the execution of its own components. When a component has an input message pending, the scheduler will choose an appropriate time to assign an available thread to execute it. This decision is made based on a number of factors, such as system load, user-required throughput, memory consumption caused by queuing, etc. Concurrency is obtained when the scheduler decides to execute multiple components at the same time.

Components

As known, a component may be service-oriented or event-oriented and may be any collection of "objects" that are consistent with an SCA-like component model. Typically, the Java Language or C++ Language or like object-oriented language, or other languages such as Python or Perl, are used for implementing SCA service components, and the data sent between components. That is, interaction between components occurs only by passing data messages across ports, or by a service call from a service consumer to a service provider, in which data values can be passed and returned. Receivers of sent messages or service calls appear as objects with synchronized methods. One thread of control exists within a component at any one time. No object is ever shared between components. Objects are either: (a) the component object itself, a "monitor" with synchronized methods, (b) "value" objects, that can be passed from component to component, but never shared, or (c) "implementation" objects, that can be shared, but only within either the component object itself or within the same value object. This discipline, which assures, among other things, that no data is concurrently owned by more than one executing component, is formalized and described in a reference authored by David Bacon, Robert Strom, Ashis Tarafdar entitled "Guava: a dialect of Java without data races," Proceedings of the 15th ACM SIGPLAN conference on Object-oriented programming, systems, languages, and applications, 2000 the contents and disclosure of which is incorporated by reference as if fully set forth herein. According to the Guava techniques, it is possible to statically check that a particular component obeys this discipline. The Guava dialect of Java, running on a JVM is just one example of the kind of component implementation language suitable for use in the environment of this invention.

To make components "wireable", the input methods for service calls serviced by a component, or the message queues for asynchronous messages received by a component, are made externally available as input "ports". Sites making calls or sending messages to other components are made externally available as output "ports" as shown in FIG. 2. It is assumed that a separate deployment-time decision is made that determines (a) how output ports are "wired" to input ports, and (b) where to place components. As a result of these decisions, some port connections may be local, and others remote. It is understood that messages and service calls may be communicated more efficiently (e.g., "by reference") when the port connection connects components within the same JVM (e.g. connection 40 in FIG. 2), and less efficiently (e.g., by copying, or by sending network messages), when these components are in different JVMs (e.g. connection 42 in FIG. 2).

As mentioned, the execution server of the invention is designed to support distributed execution across machines. Multiple instances of Java Virtual Machine (JVMs) may run on those machines or run as different processes within a single machine, depending on the deployment. As shown in FIG. 2, an example protocol for message communication between JVMs is User Datagram Protocol (UDP) 30. Thus, in the example embodiment depicted in FIG. 2, the JVM 12 communicates via UDP messaging protocol with the JVM 13. As known, the use of UDP does not provide guaranteed delivery but features better performance over Transmission Control Protocol (TCP). Instead, loss-free and order-preserving messaging is built in the middleware component of the invention as will be described in greater detail herein below.

Development

The Execution Server of the invention is distinguished from other approaches because: (1) the development environment is radically simplified: Components can be written in plain Java, and can be wired, as in SCA component models, to build a distributed flow network; (2) Components store state in plain Java primitive variables and collection classes; (3) Programmers need not use specialized methodologies and structures, such as transactions, JDBC, or entity beans to separate out component state into separate objects and to persist that state. Instead, persistence and fault-tolerance are provided automatically by the execution server(s) of the invention, despite machine failures, and faulty networks that may drop, reorder, or duplicate messages.

Deterministic Execution

In accordance with the methodology of the invention, the technology for fault-tolerance is based upon assuring deterministic, replayable execution of the system. This is an improvement over other approaches based upon transactions, or based on replication, or based on persistently logging all inter-component messages. Deterministic execution means that if the system is given the same state and the same input messages, it will generate the same output messages. Determinism implies that upon a failure of a component, its state can be restored by recovering a recent checkpoint, and replaying the events occurring since that checkpoint. Because of determinism, the state after The replay is guaranteed to be the same as the lost state. This means that state does not need to be saved persistently each time it is updated, but only intermittently.

The achievement of deterministic execution is based upon generalizing techniques from discrete event simulation and applying them to the run-time environment of the execution server. As in event simulators, each message communicated between components is tagged with a virtual time (VT). Unlike event simulators, the virtual time is chosen to be a deterministic estimate of the real time at which the message will arrive at the receiving component. The execution server of the invention guarantees that the system will behave as if the messages had arrived in virtual time order. The better the correspondence between virtual time and real time, the better the system will perform; however, deterministic execution is guaranteed regardless of how good this correspondence is. In a variant of this approach, the virtual time is a real-time deadline, and the system will adjust the scheduling to guarantee to meet these real-time deadlines. This is also unlike the case of event simulators, wherein simulated virtual time may have no obvious correlation with real time.

Deterministic execution is achieved by augmenting all communications with timestamps containing virtual times (VTs). At the system boundary, external events are received, which did not contain timestamps when they were generated. According to the invention, the system, without manual intervention, automatically assigns VTs to those events. The VTs conform to causal order, i.e., if an output is caused by an input it must not occur at an earlier virtual time, and is an approximation to the real time. A log records all the assigned VTs, because their generation is non-deterministic, and the log will be essential when replay is required later. Once events are augmented with VTs on the boundary, they travel via the connections between components, and are processed in a deterministic order. No future logging is necessary. This is in contrast to the approach used by Optimistic Recovery and other prior art techniques of transparent fault-tolerance, where logging of messages between components is required so that the non-deterministic arrival order can be replayed. It is understood that no two messages will ever have the identical VT.

When a component is chosen to execute, it may produce outputs as a result of processing the input message. The outputs are associated with VTs strictly greater than the input message's VT, reflecting the non-zero computation delay. The increment in VT, as well as the output messages, is fully determined by the input message. A component may receive inputs, for example, sent messages, or service call messages, etc. from multiple predecessor components. In this case, a deterministic merge is utilized based on VTs of the messages. VTs are generated independently by the predecessors, but they are compared locally at the merge. The message with the smallest VT can be safely processed once it is known that no predecessor can send any message in the future with an earlier VT. It is understood that, in an alternative embodiment, messages can be processed aggressively and rolled back if a message with earlier VT arrives, as in the discrete event simulation environment described in the reference to Jefferson, D. entitled "Virtual timer", ACM Transactions on Programming Languages and Systems, July 1985. Because of deterministic VT generation and deterministic merging (both of which are local to the components), the order of message processing is deterministic.

Deployment Time Mechanisms

As a main difference between deterministic execution mechanisms for persistent distributed computation, very little user intervention is required in the approach of the present invention. In particular, developers are not required to be aware of VTs or how to compute them. A set of tools is provided to dramatically simplify the application developer's work, while the benefits described herein are not compromised at all.

Placement Service

Figure 3A:
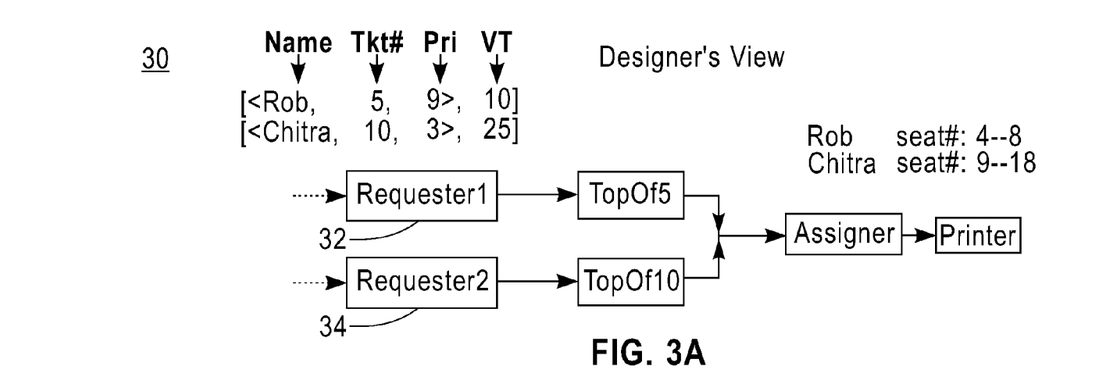
FIGS. 3A-3D depict an example application enabled by the server middleware components of the present invention, including the placement of components from an example user-design (FIGS. 3A, 3B), virtual time estimation (FIG. 3C), and, silence and curiosity message generation (FIG. 3D)
Figure 3B:
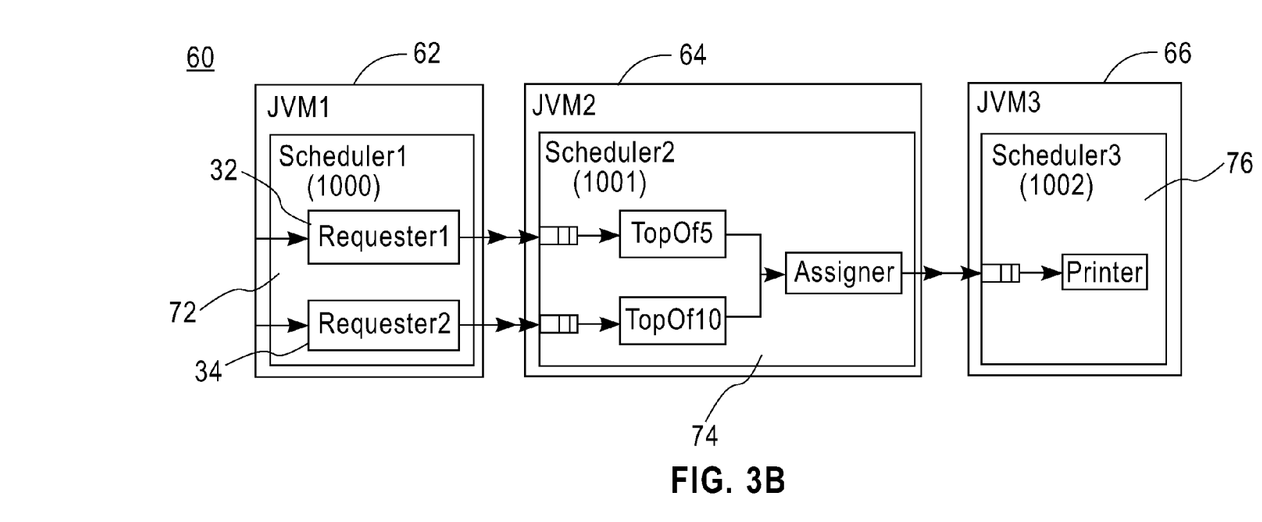

As shown in FIG. 3A, at design time, the components' computation logic may be written in plain Java, C++ or like objected-oriented code, or in other languages such as Python or Perl. Ports are defined, for example, with Java interfaces. Logical connections are created by the designers by wiring two or more ports. This high-level design completely abstracts away the distributed nature of the resulting system. It also takes such properties as deterministic execution and fault tolerance for granted. As shown in FIG. 3B, a middleware placement service component 50 is used to map this high-level design such as the design shown in FIG. 3A, onto lower-level implementation, where the most inter-related components are grouped into schedulers, and schedulers are assigned in JVMs, possibly on different machines. The placement before execution is semi-automatic, with user-supplied parameters such as metrics of machines' computation power, network capability, and placement preferences. To maximize performance, work load is balanced on different machines. At execution time, the initial placement may be fine-tuned by moving schedulers from their original machines to other machines for even better overall performance. Depending on the placement, logical connections in the developers' view may also be mapped to physical connections.

This placement service 50 simplifies the deployment task, but still provides enough flexibility by accepting user-specified configurations.

Thus, in one non-limiting example of placement, now presented for exemplary purposes, as shown in FIG. 3A, there is depicted a high-level approach of an example designer's view of a ticketing (ticket selling) system 30 that a may used to model the receipt of messages from two different requesting paths, i.e., requestors 32, 34 for reserving seats at an event, for example. These ticket requests are first received and processed to determine an amount of tickets being requested by each requestor (e.g., 5 tickets or 10 tickets) and then, finally assigned a process for printing the tickets at a printer device. The following example code portion depicts the components' logic (e.g., primitive variables, collection classes, etc.) that may be written in plain Java according to the high-level design of the example system described in FIG. 3A.

```
class Requester extends Component {
    Requester(Scheduler s, String ID) { ... }
    public RequestPort requestOut = ...
}
class TopOfN extends Component {
    TopOfN(int n, Scheduler s, String ID) { ... }
    public RequestPort requestIn = ...
    public RequestPort requestOut = ...
}
class Assigner extends Component {
    Assigner(Scheduler s, String ID) { ... }
    public RequestPort requestIn = ...
    public PrintPort assignmentOut = ...
}
class Printer extends Component {
    Printer(Scheduler s, String ID) { ... }
    public PrintPort printIn = ...
}
```

The placement service 50 will generate code for the low-level implementation as shown in FIG. 3B. In the resulting low level implementation shown in FIG. 3B, the requesters are modeled by defining ports for a first JVM 62 which receives the messages; and, further modeled are the respective ports defined at a second JVM 64 which processes the respective requests and merges the requests at an assigner component 65 that assigns the printer function component which is modeled by defining a single port for a third JVM 66 which includes a printer component 67 for performing the scheduled ticket printing process. The following example code portion depict the placement logic that may be written in plain Java according to the lower-level design of the example system shown in FIG. 3B. This following example code depicts the configuration of the first JVM 62, which as shown in FIG. 3B is designed to include a first scheduler 72 for managing requester components 32, 34.

```
class JVM1_Placement {
    public static void main(String[ ] args) {
        Scheduler s1 = new Scheduler(0, 1000);
        Requester r1 = new Requester(s1, "r1");
        Requester r2 = new Requester(s1, "r2");
        RequestPort t5In = (RequestPort)
            s1.createRemoteOutputPort(
                RequestPort.class,
                "localhost:1001/t5/requestIn", 0);
        s1.connect(r1.requestOut, t5In);
        RequestPort t10In = (RequestPort)
            s1.createRemoteOutputPort(
                RequestPort.class,
                "localhost:1001/t10/requestIn", 1);
        s1.connect(r2.requestOut, t10In);
        s1.start( );
    }
}
```

This following example code depicts the configuration of the second JVM 64, which as shown in FIG. 3B is designed to include a scheduler 74 for managing processing components corresponding requestor components 32, 34.

```
class JVM2_Placement {
    public static void main(String[ ] args) {
        Scheduler s2 = new Scheduler(2, 1001);
        TopOfN t5 = new TopOfN(5, s2, "t5");
        TopOfN t10 = new TopOfN(10, s2, "t10");
        Assigner a = new Assigner(s2, "a");
        s2.register(0, t5.requestIn);
```

```
            s2.register(1, t10.requestIn);
            s2.connect(t5.requestOut, a.requestIn);
            s2.connect(t10.requestOut, a.requestIn);
            PrintPort pIn = (PrintPart)
               s2.createRemoteOutputPort(
                  PrintPort.class,
                  "localhost:1002/p/printIn", 0);
            s2.connect(a.requestQut, pIn);
            s2.start( );
         }
      }
```

This following example code depicts the configuration of the third JVM 66, which as shown in FIG. 3B is designed to include a scheduler 76 for managing printing processing component from a single input.

```
      class JVM3_Placement {
         public static void main(String[ ] args) {
            Scheduler s3 = new Scheduler(1, 1002);
            Requester p = new Printer(s3, "p");
            s3.register(0, p.printIn);
            s3.start( );
         }
      }
```

Automatic Code Enhancer

In the invention, a program transformer augments the user-written component to produce a component compatible with the run-time execution environment. In particular, the program transformer supplies the following enhancements: 1) All interfaces of input and output messages or method calls are augmented with a field that holds the VT; 2) Each method that processes a message arriving at an input port is augmented with an estimator that computes the "delta-VT" for each output message it generates, and for the return from that method. The delta-VT represents a deterministic estimate of the amount of real-time that would elapse from the start of the method to either the generated output message or to the return; and, 3) Each component is augmented with code that tracks incremental changes to its state since the last soft-checkpoint, and which upon request from the scheduler, serializes an incremental soft-checkpoint record.

Soft checkpoints are so called, because any single checkpoint can be lost without compromising the system's ability to recover—a lost checkpoint merely means that recovery must proceed from the previous checkpoint, which may lengthen the time to recover after a failure, but will not affect the eventual ability to recover. Conversely, the component is augmented with code that reconstructs a state from a collection of incremental soft-checkpoint records. Optionally, a component may be augmented with code that generates "eager silences". That is, given that it is now known that no input messages are arriving on its input ports through a given time t, it computes the earliest delta-VT beyond time t for which it is possible for a message to appear on given output ports. Such a computation can be used for the purpose of sending silences to components connected to these input ports. Since a range of silent timestamps promises that no messages will ever be sent from that component with those timestamps, such information may possibly enable receiving components to proceed to process a waiting message because it is now known to be the earliest possible message.

Figure 3C:
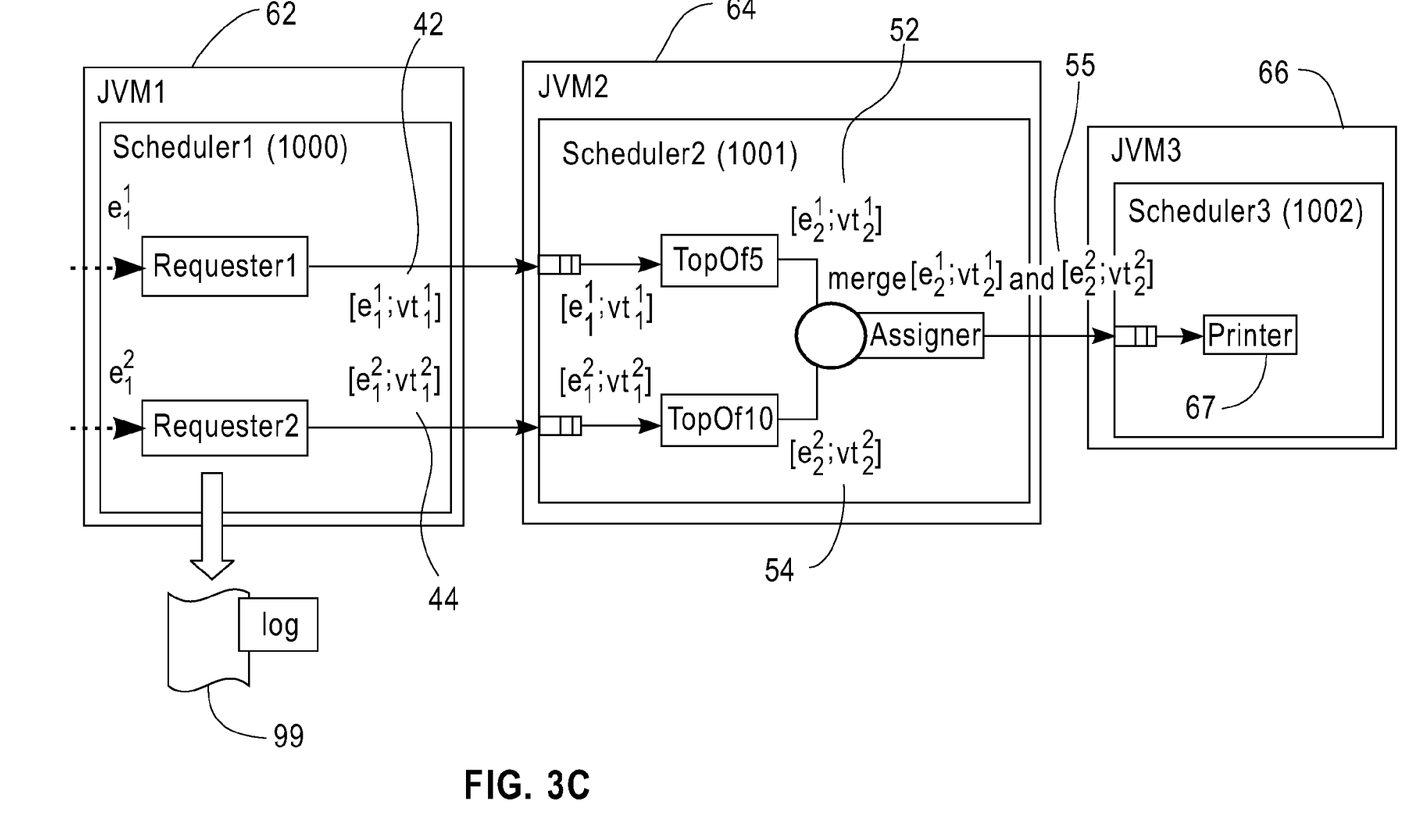

FIG. 3C depicts in more detail the determinism of VT used for augmenting the message structures required for implementing the invention as depicted by the low-level design in the example ticketing system described in the example of FIG. 3B. It is understood that messages or events ("e") are associated with VTs on the system boundary. Currently VTs are generated in an arbitrary way, consistent with causality. However, they may be an estimation of the real time. Thus, as shown in FIG. 3C, during run time, for the received message structure 42 including example associated data string ($e_1^1$) received at the first requester component 32 of the first JVM 62 there is associated a first VT value ($vt_1^1$) that is added to the message structure 42, while the message structure 44 including example associated data string ($e_1^2$) received at the second requestor 34 is associated with a VT value ($vt_1^2$) that is added to the message structure 44. FIG. 3C additionally depicts the tracking of incremental changes to its state since the last soft-checkpoint, which upon request from the scheduler, causes generating an incremental soft-checkpoint record depicted by entry into a log 99 in a data storage device. This log 99 records all the assigned VTs, because their generation is non-deterministic, and the log will be essential when replay is required as will be described in greater detail herein below. These augmented event or request messages 42 ($e_1^1$; $vt_1^1$) and 44 ($e_1^2$; $vt_1^2$) are each input to the second JVM 64 at their scheduled VTs (virtual times) where they are processed by respective request message processing components in JVM 64. That is, as shown in FIG. 3C, after processing a received input augmented request message 42 in the second JVM 64, there is generated a further message 52 augmented to contain a computed VT value ($e_2^1$; $vt_2^1$) that is output from the first component of the second JVM 64; and, likewise, there is generated a further message 54 augmented to contain a computed VT value ($e_2^2$; $vt_2^2$) that is output from the second component of the second JVM 64. At a merge point, depicted by the assigner component 65, events from multiple steams are compared using their VTs. Thus, as shown in FIG. 3C, output from the assigner component of the second JVM is a deterministically merged message sequence 55 comprising temporally sequenced messages 52 and 54, i.e., [$e_2^1$; $vt_2^1$] and [$e_2^2$; $vt_2^2$]. The deterministic merger implemented in the third JVM 66 will then sequence operations in a deterministic order for the printing component 67 based on the merged VT values in received message 55.

Tolerance of Message Loss and Reordering

As mentioned, within a JVM, the communication between components is efficiently implemented by reference passing. Intra-JVM communication is also lossless and order-preserving. Between JVMs, UDP communication may be used even though this may cause message loss or reordering, because such loss or reordering is tolerated by the middleware component of the invention that implements concept of silence and curiosity messages that are sent between schedulers but not within schedulers.

Figure 3D:
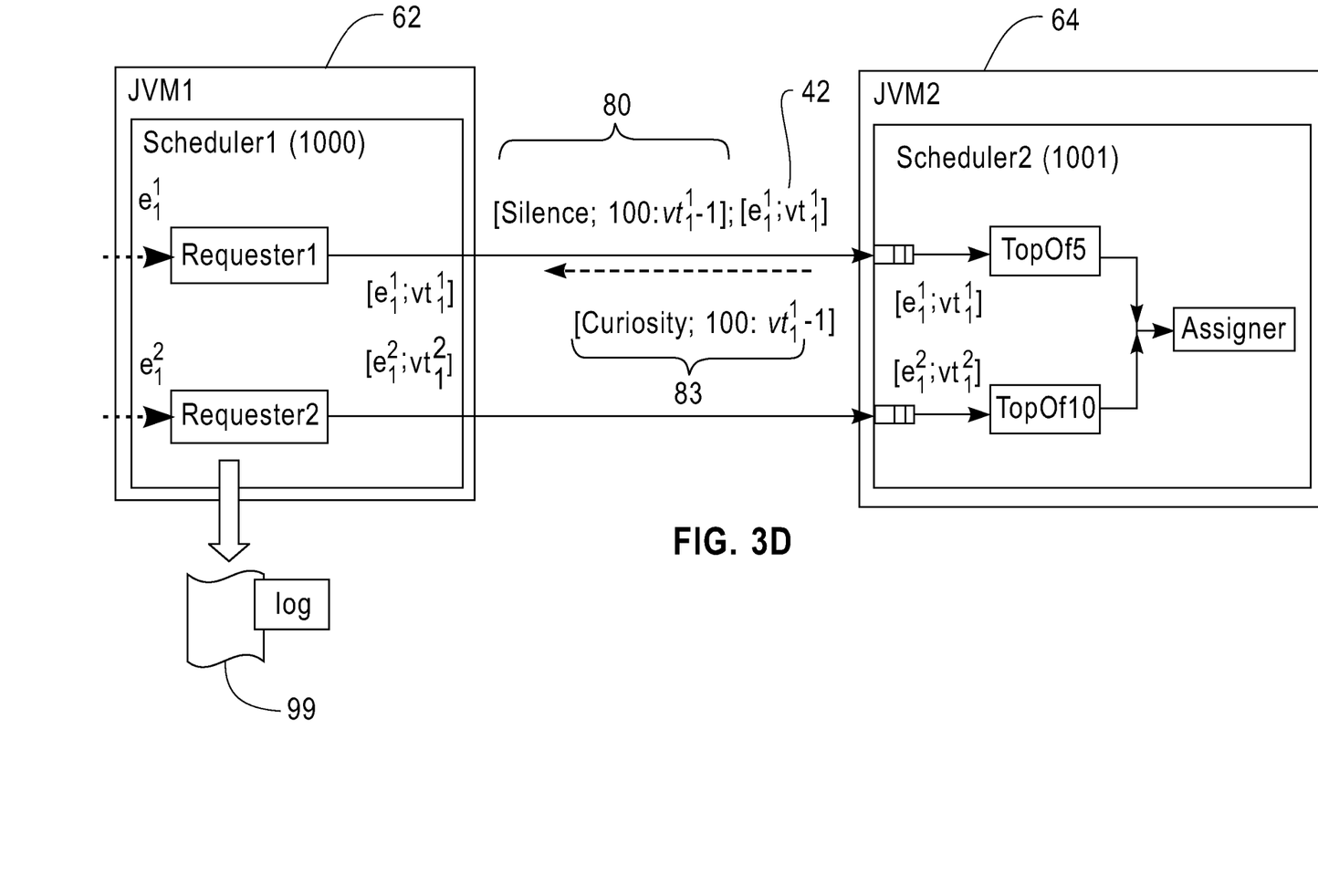

Continuing to FIG. 3D, there is shown the incorporation of silence and curiosity messages to ensure detection of missing messages in the inventive system. As mentioned herein in an example application of the present invention as depicted in FIGS. 3A-3C, and now shown in FIG. 3D, it is assumed that a time gap exists in VT, that is, unless the two messages are exactly next to each other in the time line. The existence of the time gap is detected by the server's middleware component, e.g., scheduler. For example, after the first JVM 62 sends the first augmented message 42, and prior to sending the second augmented message, the JVM 62 generates and sends one or more silences, i.e., silence message 81, to fill the gap so that the receiver, e.g., JVM 64, gets continuous knowledge of either messages or silences. A silence message defines a pair of numbers designating a range of time ticks of VT that are known not to contain messages. For example, the message 80 in FIG. 3D sent just before the message 42 may contain the data [Silence; 100: $vt_1^1-1$], meaning that all ticks of VT in the range from 100 to $vt_1^1-1$ are known not to contain messages. Because of silence messages, receivers can account for every tick as either definitely containing a message or a silence. If a data or silence message is lost, the receiver will notice a gap. Gap detection is performed on the receiver side. If a gap exists for a certain period (defined as a user-configurable or programmable parameter), the receiver, e.g., JVM 64 may decide that some messages or silences have been lost, and then issue a curiosity message 83 for receipt back to the sender, e.g., JVM 62. A curiosity message defines a pair of numbers designating a range of time "ticks" of VT for which the receiver has no knowledge of data or silence, and is therefore "curious" about For example, if this silence message was somehow lost, the curiosity message will read [Curiosity; 100: $vt_1^1-1$]. A curiosity message will trigger the resending of the previous messages or silences by the sender for the range of ticks being queried. Senders must be prepared to resend these messages or silences until the receiver has successfully taken a soft checkpoint and hence promises never to request a resend again.

If curiosity messages are lost, or the resent messages are lost, the curiosity messages will be resent. As long as the same message is not infinitely often lost, eventually, lost messages will be retrieved. It should be understood that, a message may arrive late, and may duplicate a resent message, but this does not cause any problems since it is safe for a receiver to discard any message whose VT matches a time for a message it has already processed. (No two messages will ever have the identical VT). Reordering is also tolerated because the receiver simply refuses to process a message if there is still a gap before it. Thus, as shown in FIG. 3D, queuing, silence and curiosity altogether guarantee message processing in the correct order.

Virtual Time Estimator

So far, the VT generation is allowed to be arbitrary provided that it is fully deterministic and it preserves the message causality. Any such VT assignment guarantees deterministic execution. However, if VTs are too far out-of-sync with real time, then a performance penalty is seen, because at a merge, the receiver would refuse to process the next message until it is sure that it will not receive any message earlier in VT. This may cause the messages generated earlier in real time to be processed later because they acquire larger VTs due to inaccuracy of the estimation. An automatic VT estimator is provided to attempt to maintain VTs and real time in approximate synchronization so that this pessimism does not cause unacceptable performance loss. There is both a static (i.e., pre-execution) and a dynamic (i.e., during execution) component to this VT estimation. Statically, the automatic VT estimator estimates the computation delay on individual components, based on the known complexity of the code. At deployment time, the estimator may also take into account known properties of the environment on which the component was deployed. This will adjust the computation delay estimate to reflect things such as network latency, average CPU load, garbage collector performance, expected memory consumption, threading, etc. However, it should be emphasized that the computation delay estimate must be a deterministic, repeatable function of the component state. It may not take into account non-deterministic factors, such as the actual current CPU load. If, unfortunately, a scheduler notices that the disparity between VT and real time becomes too large, it can take one of two possible actions:

1. The scheduler may change its priority relative to other schedulers in the machine so that it slows down or speeds up, and reduces the disparity.

2. The scheduler may make a non-deterministic decision—a so-called "determinism fault"—to adjust the parameters to the estimators used within the scheduler. This adjustment, being non-deterministic, is allowed, unlike the normal computation delay estimate, to take into account non-deterministic factors. Because such a decision violates determinism, this action must be logged in stable storage in order to guarantee proper replay. In effect, any replay of VTs prior to the decision must use the old estimator, and any replay of VTs subsequent to the decision must use the new estimator. A determinism fault may result in the change to particular time estimates for particular messages. The goal of the system is to make the static estimators good enough so that drift between VT and real time is minimized and can be controlled by adjusting scheduling priorities, so that determinism faults are extremely rare events.

Real-Time Analysis

For non-time-aware components, the introduction of timestamps is automated with the VT estimator of the inventive middleware. However, some applications may need to be time-aware; or, in an even more complex scenario, certain applications may contain a mixture of non-time-aware components and time-aware components. To satisfy the need for timing control, the middleware component of the present invention allows timing constraints to be specified by the designers, which are automatically compiled into extra time controlling code. At run time, this code enables the schedulers to satisfy the time constraints by prioritizing the components, or moving components. That is, real-time schedulers may be programmed to work together with the placement service to guarantee real-time deadlines. It is likely that the placement service will need to do some admission control before deploying such schedulers, to assure that there is enough reserve capacity to meet deadlines. Additionally, a new kind of determinism fault may arise: if it appears that due to an unusual condition, a real-time deadline will not be met for a given computation, a non-deterministic decision to use an alternative computation (with presumably less overhead) may be taken. As with any determinism fault, the decision to make such a change will need to be logged.

Tolerance of Machine Failure with High Availability

In a distributed system, machines may be shut down or disconnected from the network unexpectedly, or may fail. Many contemporary applications take advantage of the collaboration among machines. The use of multiple machines enables high availability. With this property, the failure of some machines does not interfere with the application's overall functionality. In the execution server of the present invention, fault tolerance is transparent. The middleware component intermittently creates soft checkpoints for individual schedulers. A soft checkpoint is a compact image of the scheduler's state, including the components in it, the established connections, the queued messages, waiting service calls, etc. Soft checkpoints may either contain full state, or may contain incremental changes since the previous soft checkpoint. The state of user-defined components (including, for example, language-level entities such as Java primitive values and objects with cross references) is also recorded in the checkpoint, so that when the machine fails and recovers, the computation can be resumed.

Figure 4:
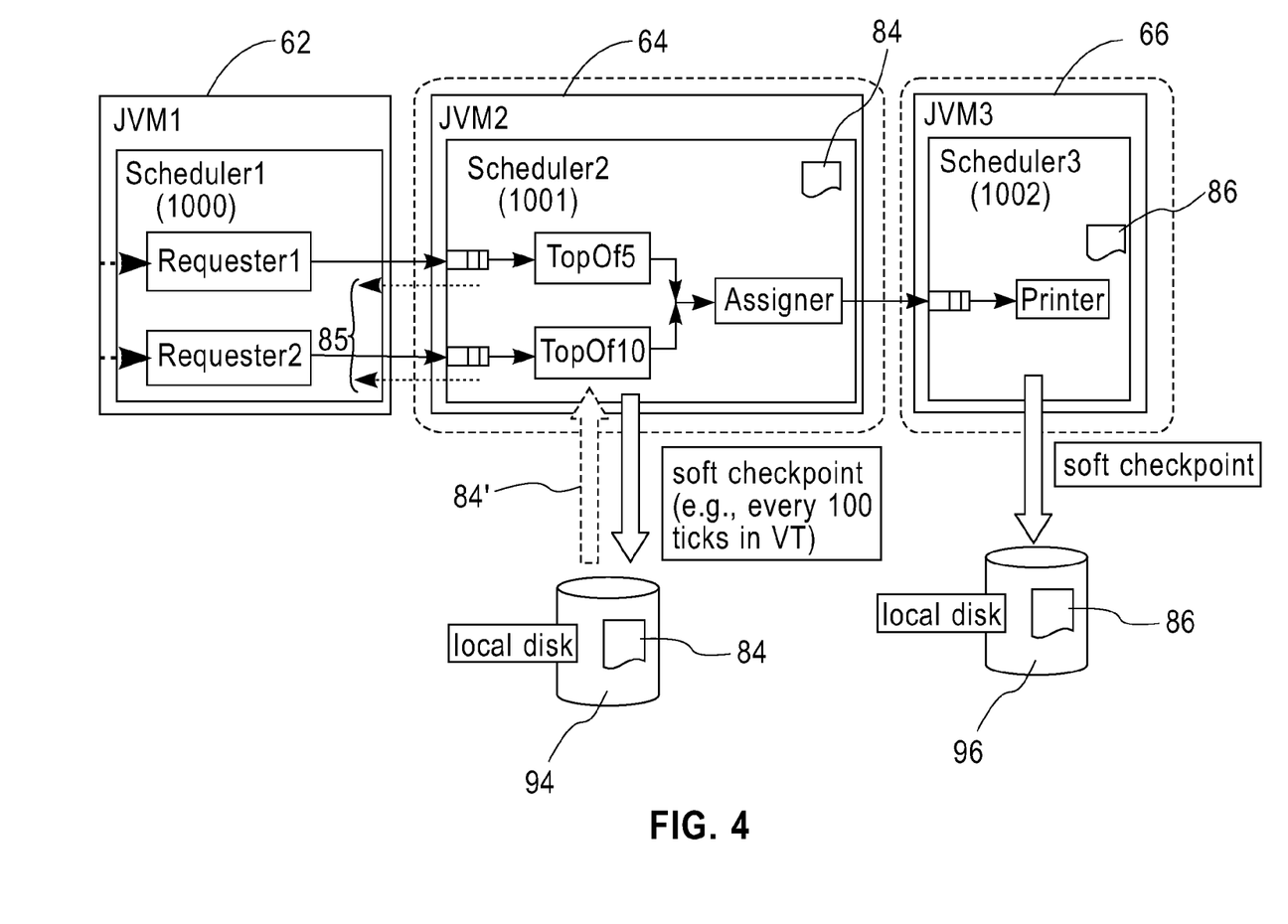
FIG. 4 demonstrates an overview of checkpointing to a memory storage device and checkpoint recovering from a hard disk according to the principles of the invention.

Thus, for the example application of the present invention as depicted in FIGS. 3A-3D, and now shown in FIG. 4, checkpoint information 84, 86 for each of the schedulers in JVM's 64, 66 are stored and intermittently or incrementally updated on a local memory storage device, e.g., hard disk drive 94, 96, respectively. However, it is understood that these checkpoints may be stored at or on remote machines.

During execution, a JVM machine may crash, and due to this event, the schedulers running on it stop and completely lose their state since their last checkpoints. When the machine restarts, it recreates the schedulers with their last checkpoints. Thus, for the example application of the present invention as depicted in FIGS. 3A-3D, and shown in FIG. 4, assuming a crash event at JVM 64, stored checkpoint information 84' for the example scheduler in JVM 64 will be communicated from the local memory storage device, e.g., hard disk drive 94, back to the restarted scheduler component executing at JVM 64. These checkpoints are in the schedulers' past because some messages may have been received and even processed after the checkpoints were taken. The schedulers will thus independently send curiosity messages 85 to their predecessors, causing the predecessors to resend the missing messages. According to the invention, the missing messages will then be reprocessed, and due to the deterministic execution afforded by the present invention, the same results will be generated. When a scheduler catches up with the time at which it failed, its state becomes identical to its state right before it failed. From then on, it continues to process new messages.

As mentioned, checkpoint information for each of the schedulers in JVM's may be stored and intermittently or incrementally on a remote machine (e.g., JVM). Thus, in an alternate embodiment, a remotely located scheduler may perform a "passive backup" by storing checkpoints from another scheduler. If passive backups are used to store the checkpoints, then when a failure is detected, the passive backup creates instances of the backed up components, i.e., spawns a replica, and becomes active, resuming the failing scheduler's work until it restarts and catches up with the missing computation. Passive backups, unlike active replicas of some other fault-tolerant systems, do not perform redundant computations. They merely hold checkpointed state, so that if the active machine fails, the backup is able to rapidly take over the computation with minimal delay.

Figure 5A:
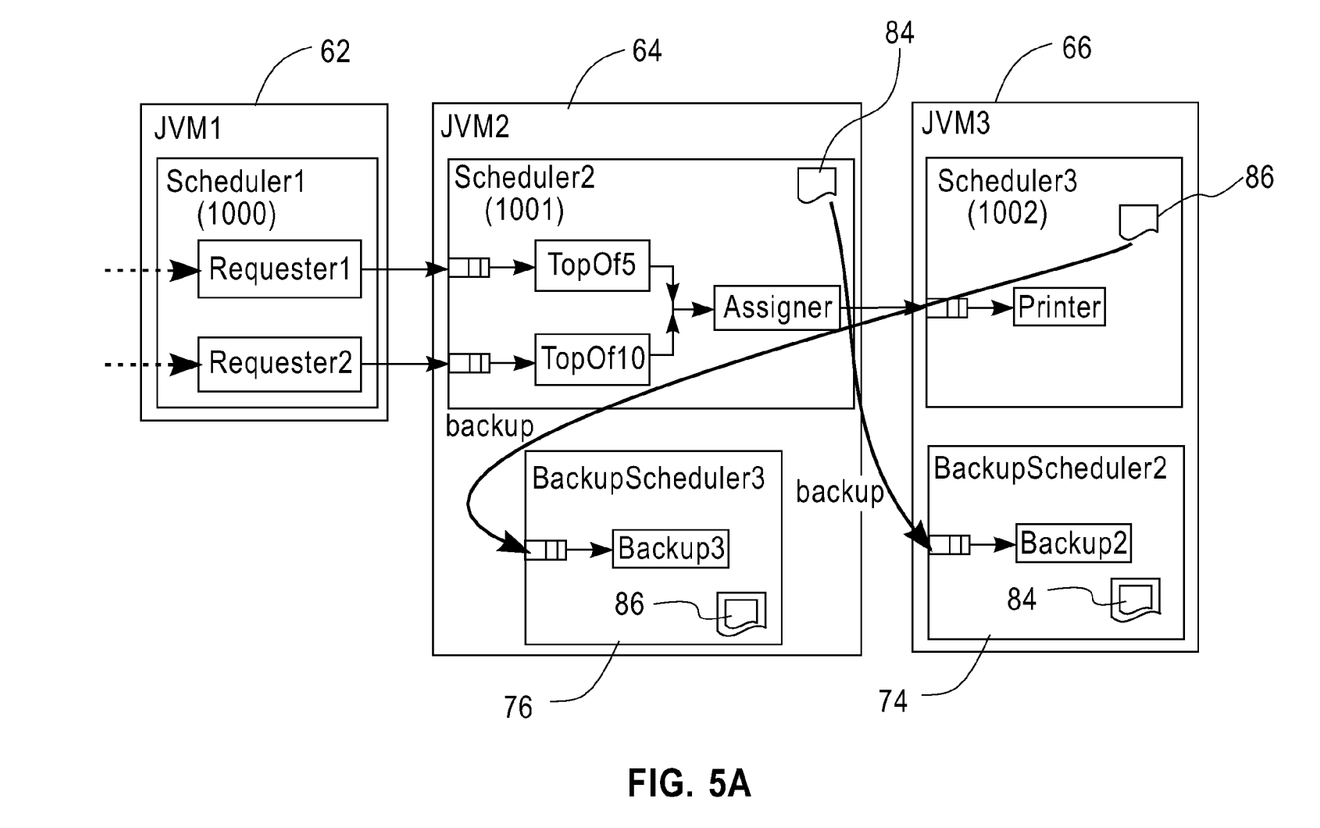
FIGS. 5A-5C demonstrates an overview of using passive remote backups and spawning scheduler replicas for providing the high availability afforded by the present invention.
Figure 5B:
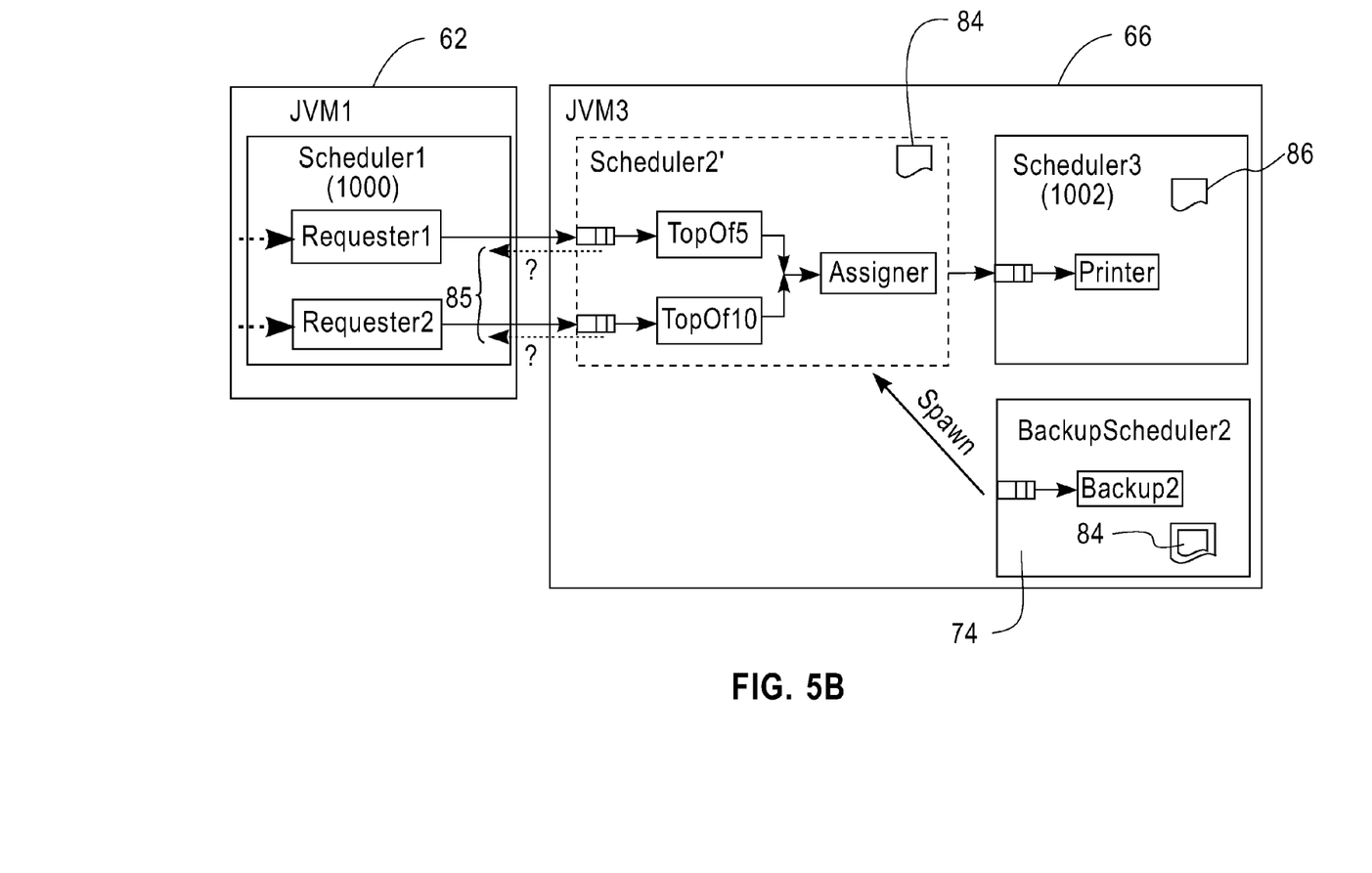

Thus, for the illustrative example application of the present invention as depicted in FIGS. 3A-3D, and now shown in FIG. 5A, soft checkpoint information 84 for the example scheduler in JVM 64 will be communicated to a memory associated with a back-up scheduler component 74 for the second JVM 64 that is remotely stored in the third JVM 66 for storage thereat; likewise, as shown in FIG. 5A, soft checkpoint information 86 for the example third scheduler in JVM 66 will be communicated to a memory associated with a back-up scheduler component 76 for the third JVM 66 that is remotely stored in the second JVM 64 for storage thereat. Thus, for example, when JVM 64 that includes scheduler2 and back-up scheduler component 76 becomes disabled or otherwise crashes, a replica of the scheduler2 that was executing in JVM 64 may be generated as shown in FIG. 5B. That is, in JVM 66, a replica of the scheduler2 that was executing in JVM 64 may be spawned based on the remote passive back-ups. That is, a new scheduler scheduler2' is spawned that includes the components of the second JVM 64 for execution. Based on a maximum failure detection delay and the time for replica creation, the maximum downtime can be estimated in case of one failure which provides high availability assurance.

Figure 5C:
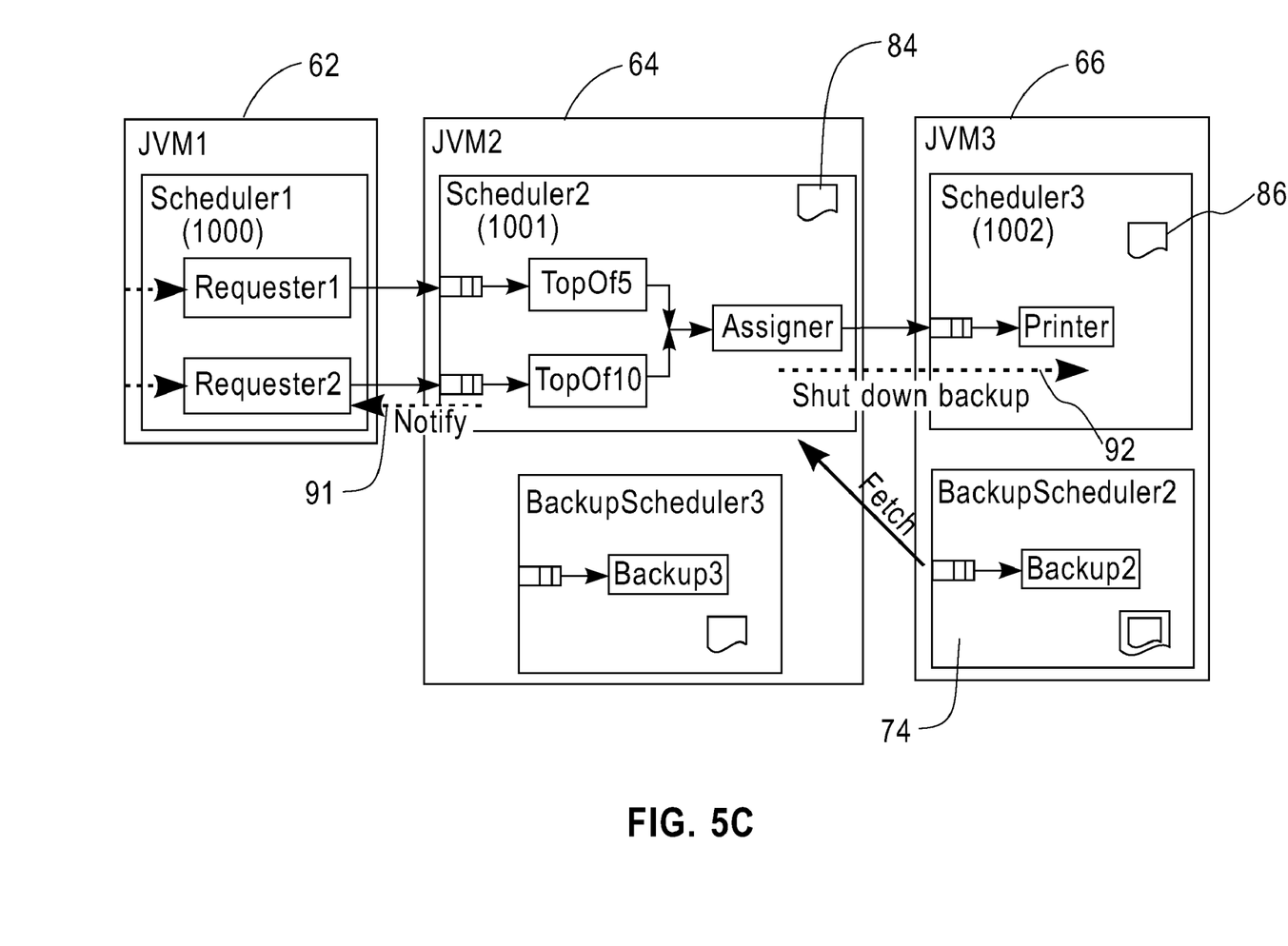

Finally, for the illustrative example application of the present invention as depicted in FIGS. 3A-3D, and now shown in FIG. 5C, upon recovery of the crashed second JVM 64, the revived scheduler2 will fetch the checkpointing information that had been stored at the spawned replica, i.e., scheduler2', in the third JVM 66. Consequently, it may be indicated to predecessor components on other machines (e.g., JVM1) that the second JVM 64 is up and running via a notify message 91; and, further, indicated to the third JVM 66 that the spawned remote back-up of the scheduler2 (i.e., scheduler2') may be terminated.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A computing system comprising:
a plurality of software components each implementing logic to perform a task, the components executing in a run-time execution environment comprising one or more machines connected in a network and adapted for communicating messages between the components, said messages characterized as having non-deterministic arrival orders at a receiving component;
means for automatically generating a deterministic timestamp and associating said deterministic timestamp in conjunction with a message to be communicated from a sender component to a receiver component during program execution, said deterministic timestamp representative of estimated time of arrival of said message at said receiver component;
means for deterministically executing said component by using said deterministic timestamps to generate a unique arrival order of input messages;
means for tracking state of a component during program execution, and checkpointing said state to a local storage device;
wherein upon failure of a machine, said component state is restored by recovering a recent stored checkpoint and re-executing the events occurring since said last checkpoint.

2. The deterministic computing system as claimed in claim 1, wherein said component state is checkpointed to backup processor device.

3. The deterministic computing system as claimed in claim 1, wherein said execution environment comprises a single Java virtual machine, each said components stored in said single Java virtual machine.

4. The deterministic computing system as claimed in claim 1, wherein said execution environment comprises a plurality of Java virtual machines, said components executing in a distributed manner across said plurality of Java virtual machines.

5. The deterministic computing system as claimed in claim 4, wherein said execution environment includes a scheduler component for managing execution of one or more components, said scheduling including allocating an execution thread for a component in said execution environment.

6. The deterministic computing system as claimed in claim 4, wherein a component receives input messages at said non-deterministic arrival orders from multiple predecessor components, said system further comprising a merger means for performing a deterministic merge based on the input message's deterministic timestamp.

7. The deterministic computing system as claimed in claim 1, wherein a state of said component is updated intermittently.

8. The deterministic computing system as claimed in claim 1, wherein said deterministic timestamp is computed as an estimate of a real time at which a message arrives at said receiving component.

9. The deterministic computing system as claimed in claim 1, further comprising:
means for detecting a time gap between successive message transmissions from a component; and,
means enabling transmission of a silence message, from a sender component to a receiver component, for ensuring correct temporal flow of messages from said component in said execution environment, said silence message designating a range of time that is known not to contain any messages.

10. The deterministic computing system as claimed in claim 9, further comprising:
means for issuing a curiosity message defining a range of time for which a receiver component has no knowledge of data or silence, said curiosity message issued by a receiver component back to a sender component to trigger a resending of any previous messages or silence message when a component receiver determines that some messages or silence messages have been lost due to failures in a network connection between machines.

11. A method for deterministic execution of components in a computing system providing a run-time execution environment adapted for enabling message communication amongst and between said components, each said component implementing logic to perform a task and, each message characterized as having non-deterministic arrival order at a receiving component, said method comprising:
automatically generating a deterministic timestamp and associating said deterministic timestamp in conjunction with a message to be communicated from a sender component to a receiver component during program execution, said deterministic timestamp representative of estimated time of arrival of said message at said receiver component;
deterministically executing said component, by using said deterministic timestamps to generate a unique arrival order of input messages;
at a component, tracking state of said component during program execution, and checkpointing said state in a local storage device;
wherein upon failure of a component, said component state is restored by recovering a recent stored checkpoint and re-executing the events occurring since said last checkpoint.

12. The method as claimed in claim 11, further comprising: repeating the execution of said receiving component by processing said messages in the same order as messages associated with said deterministic timestamps recorded in said stored state.

13. The method as claimed in claim 11, further comprising managing execution of said one or more components in said execution environment according to said deterministic timestamps associated with received messages, said managing including assigning an execution thread to a component in said execution environment.

14. The method as claimed in claim 13, wherein a component receives input messages at said non-deterministic arrival orders from multiple predecessor components, said method further comprising performing a deterministic merge based on the input message's deterministic timestamp.

15. The method as claimed in claim 13, further comprising intermittently updating a soft checkpoint of said component.

16. The method as claimed in claim 11, wherein said deterministic timestamp is computed as an estimate of a real time at which a message arrives at said receiving component.

17. The method as claimed in claim 11, further comprising:
detecting at a component a time gap between successive message transmissions from said component; and,
enabling transmission of a silence message, from a sender component to a receiver component, for ensuring correct temporal flow of messages from said component in said execution environment, said silence message designating a range of time that is known not to contain any messages.

18. The method as claimed in claim 17, further comprising:
issuing a curiosity message defining a range of time for which a receiver component has no knowledge of data or silence, said curiosity message issued by a receiver component back to a sender component to trigger a resending of any previous messages or silence message when a component receiver determines that some messages or silences have been lost.

19. A system for enabling deterministic execution of component-oriented applications comprising:
a sub-system enabling communication of messages amongst and between components in a run-time execution environment, said components comprising one or more ports for which message inputs are received or are output from said components, and each said component implementing logic to perform a task and, each message characterized as having non-deterministic arrival order at a receiving component;
a means for mapping high-level design onto a lower level implementation in which components are assigned to particular processing engines of said execution environment;
a code enhancing means for:
automatically generating a deterministic timestamp and augmenting an input or output message of an associated component with said deterministic timestamp in conjunction with a message to be communicated from a sender component to a receiver component during program execution, said timestamp representative of estimated time of arrival of said message at said receiver component; and,
augmenting a component with code for tracking incremental changes to its state;
wherein, a state of a component is tracked during program execution, and said component state checkpointed in a local storage device, and,
wherein upon failure of a component, the component state is restored by recovering a recent checkpoint and re-executing the events occurring since the last checkpoint.

20. The system as claimed in claim 19, wherein said execution environment is a distributed computing system.

21. A computer-readable storage medium-readable by a machine, tangibly embodying a program of instructions executable by the machine to perform method steps for deterministic execution of components in a computing system adapted for enabling message communication amongst and between said components, each said component implementing logic to perform a task and, each message characterized as having non-deterministic arrival order at a receiving component, said method steps comprising:
automatically generating a deterministic timestamp and associating said deterministic timestamp in conjunction with a message to be communicated from a sender component to a receiver component during program execution, said deterministic timestamp representative of estimated time of arrival of said message at said receiver component;

deterministically executing said component, by using said deterministic timestamps to generate a unique arrival order of input messages;

at a component, tracking state of said component during program execution, and checkpointing said state in a local storage device;

wherein upon failure of a component, said component state is restored by recovering a recent stored checkpoint and re-executing the events occurring since said last checkpoint.

22. The computer-readable storage medium-readable by a machine as claimed in claim 21, wherein said system is deterministic by repeating the execution of said receiving component by processing said messages in the same order as messages associated with said deterministic timestamps recorded in said stored state.

* * * * *